June 9, 1931. C. G. MILLER 1,809,137
AUTOMATIC CONVEYER AND TRANSFER MECHANISM
Filed June 30, 1928   5 Sheets-Sheet 1
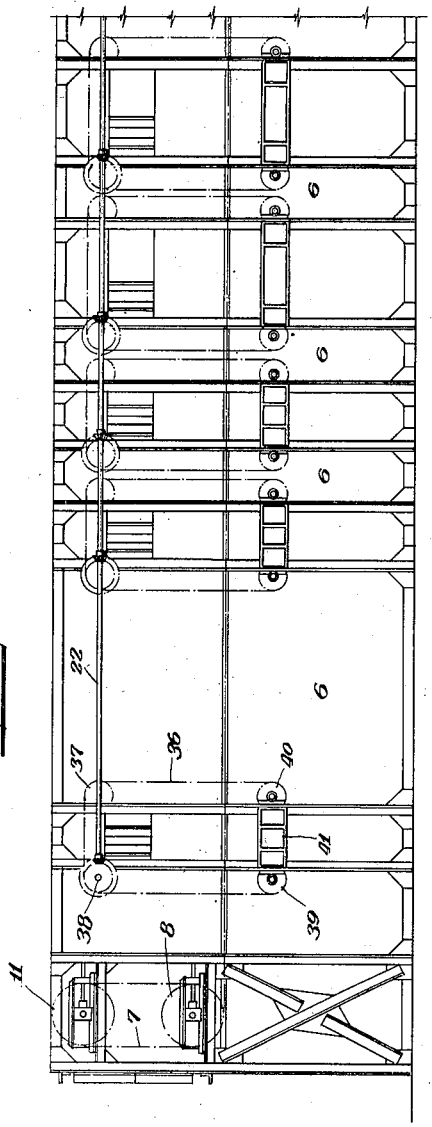
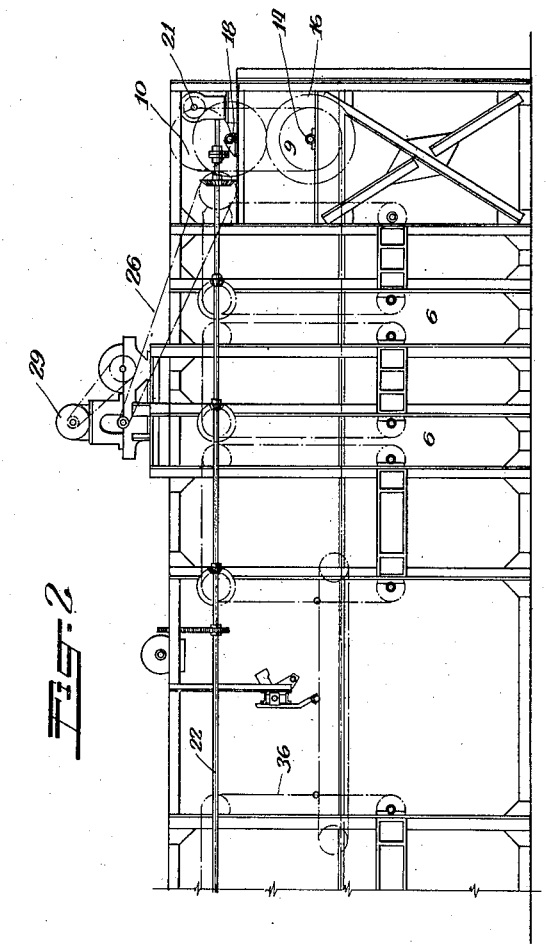
Inventor:
Constantine G. Miller.

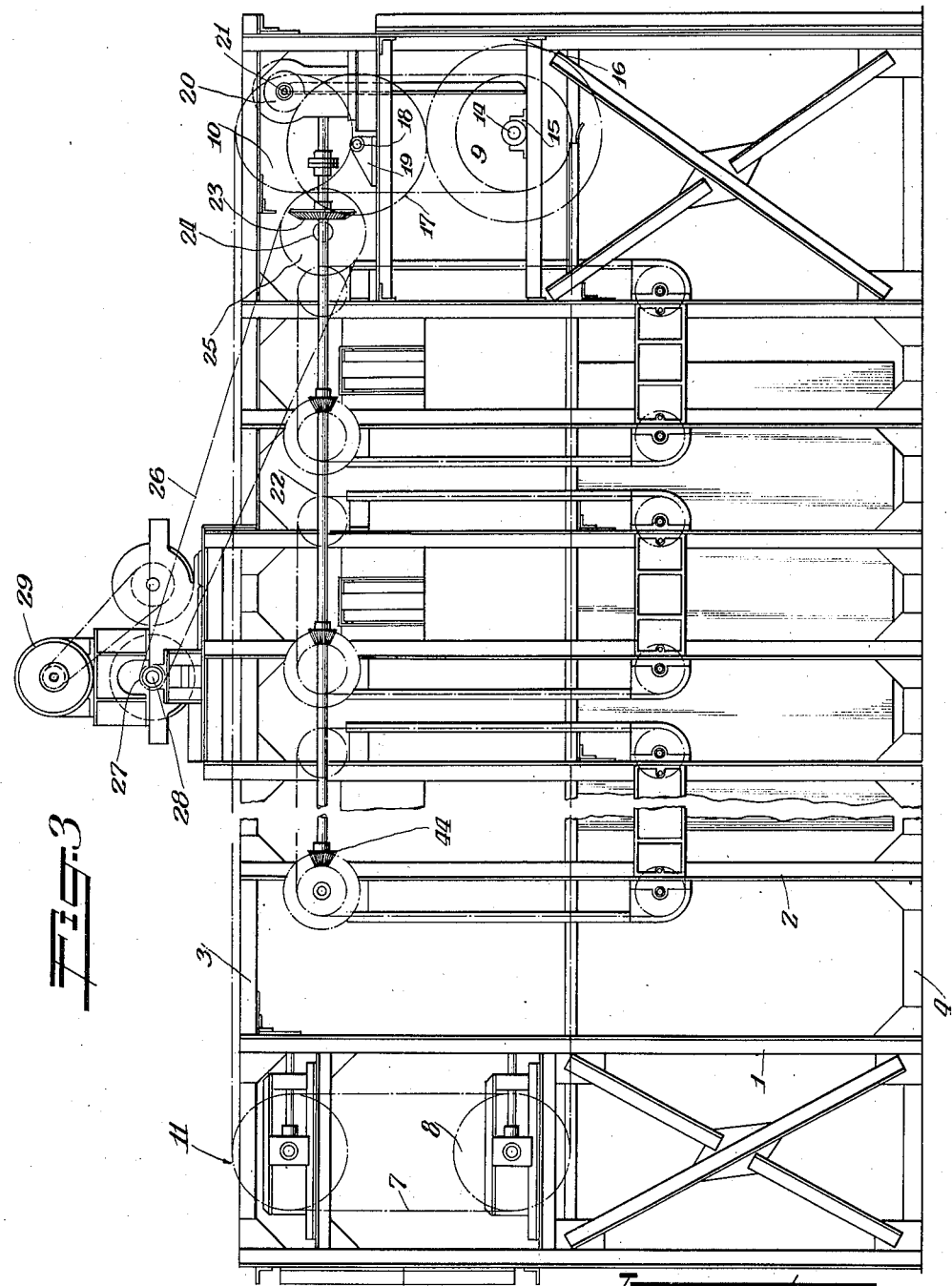

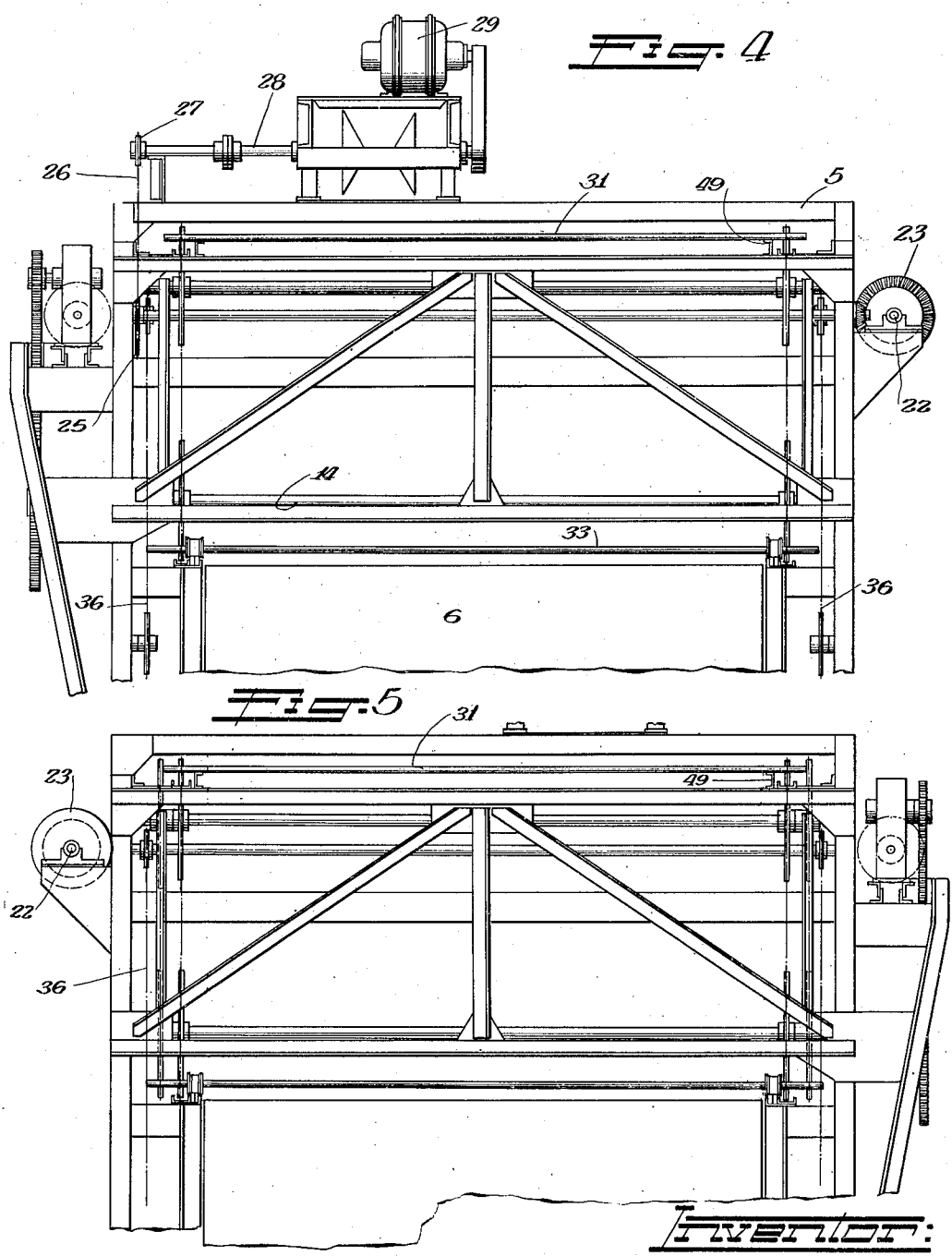

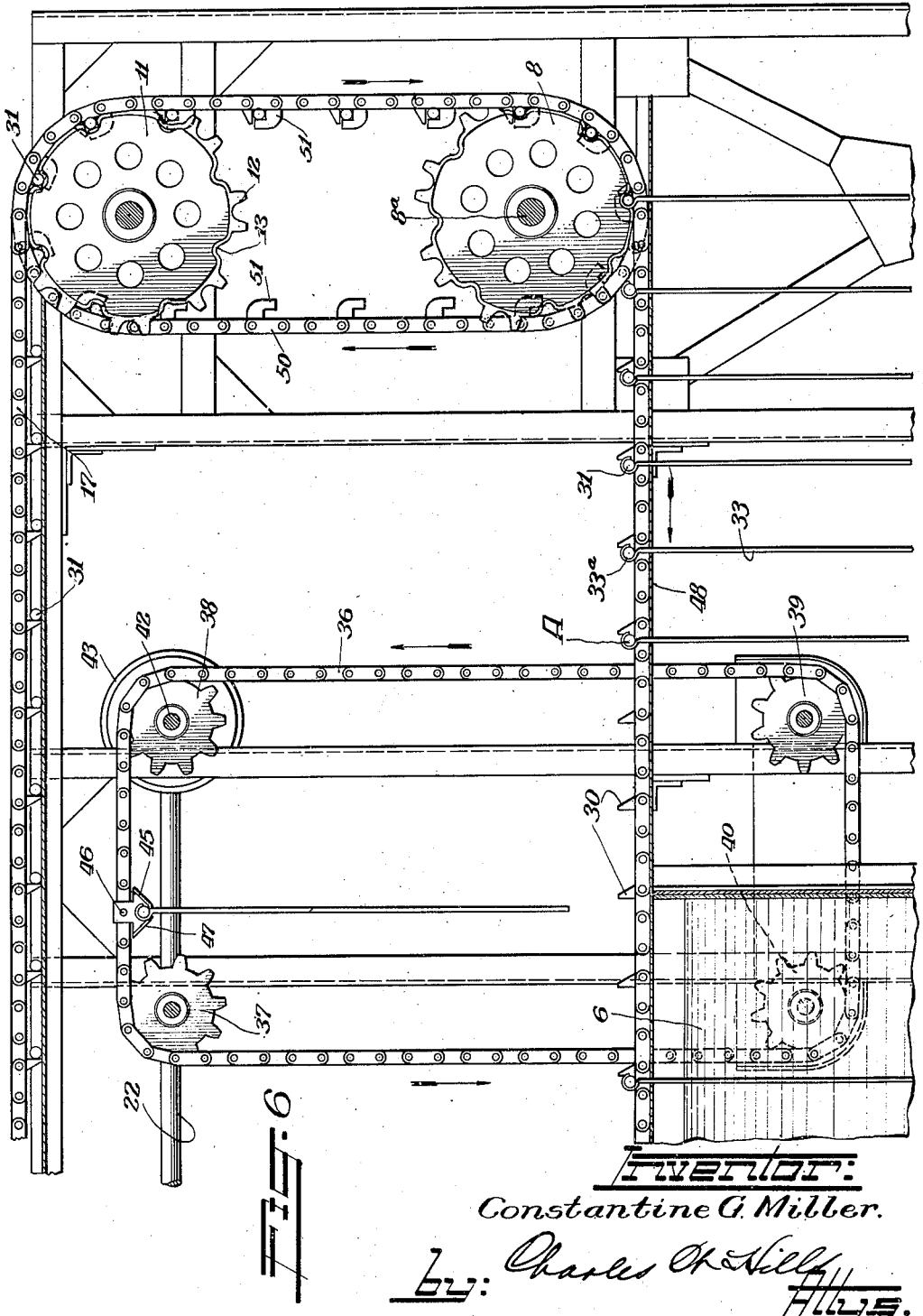

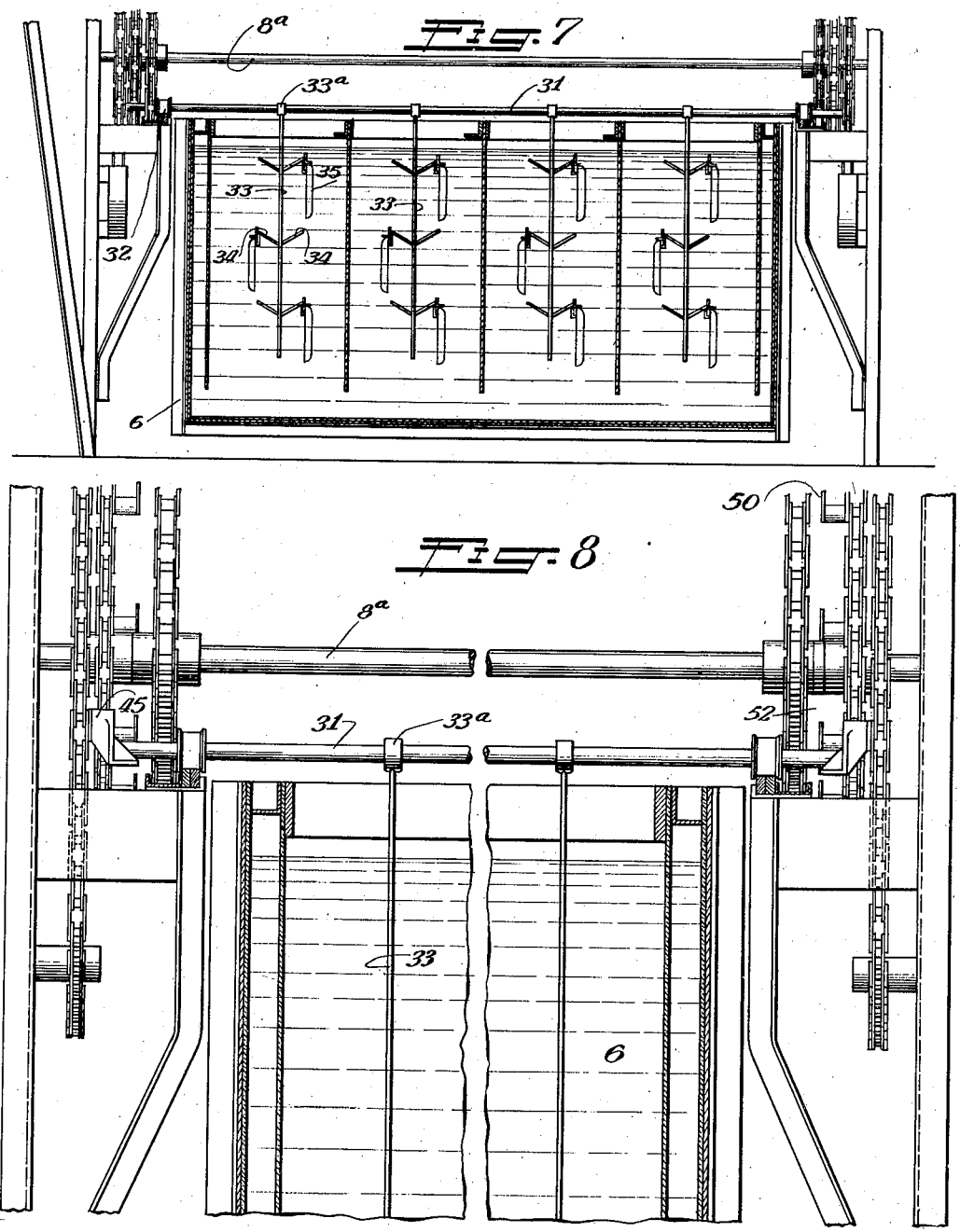

Patented June 9, 1931

1,809,137

UNITED STATES PATENT OFFICE

CONSTANTINE G. MILLER, OF CHICAGO, ILLINOIS, ASSIGNOR TO THE MEAKER COMPANY, A CORPORATION OF ILLINOIS

AUTOMATIC CONVEYER AND TRANSFER MECHANISM

Application filed June 30, 1928. Serial No. 289,587.

This invention relates to an automatic conveying and transfer mechanism which is made of standard parts so arranged that accurate timing of the transfer mechanism with respect to the main conveying mechanism may be secured.

The invention is shown in connection with an electroplating machine although it is not limited to such a machine.

The conveying and transfer mechanism will be described as used in an electro-plating machine wherein the complete series of plating operations such as washing, rinsing, plating and the like are automatically performed, the parts to be plated being suspended from work rods which rods are moved through the machine by the main conveyer chain and transferred from one tank to the next by the transfer mechanism.

The invention contemplates an endless main conveyer chain arranged to travel substantially the length of the plating machine, so that the work rods moved by the main conveyer chain will be moved along trackways adjacent the tanks containing various kinds of baths and transfer mechanism for lifting the work rods over the rear end of one tank and delivering the rods onto the trackway at the front end of the next tank, automatically and progressively.

The invention further contemplates cups pivoted to the transfer conveyer chains of such nature as to engage a work rod within certain limits in position to be transferred from the main conveyer to a transfer conveyer.

The invention further contemplates the arrangement of endless transfer conveyer chains to operate in vertical planes adjacent the main conveyer chain and which transfer conveyer chains are carried and driven by sprocket wheels. The wheels are of uniform size and number of teeth throughout the machine. The transfer conveyer chains may be adjusted so as to bring the cups carried by these chains into position to pick up a work rod which is being moved by the main conveyer chain, which chain has fingers or dogs at intervals for moving the work rods along suitable trackways adjacent the several tanks of the machine.

The chains and the sprocket wheels are made of standard materials and sizes and are adjusted by moving the transfer conveyer chains with respect to the sprockets in either direction so as to properly time the pick-up of a work rod by the transfer conveyer with respect to the main conveyer chain.

An object of the invention is to provide a conveying and transfer mechanism which may be readily manufactured from standard parts and synchronized.

Another object is to provide a conveying and transfer mechanism which will be automatic in operation.

A further object is to provide a conveying and transfer mechanism which may be constructed of standard parts and which operates in positive, automatic and efficient manner.

A further object of the invention is to provide a conveying and transfer mechanism for an electro-plating machine or apparatus wherein the pieces to be plated are automatically moved through the several tanks of the machine, transferred from one tank to the other, and operated in timed relation.

Other and further objects of the invention will be apparent from the following description, drawings and appended claims.

One form of the invention is shown in the accompanying drawings in connection with an electro-plating machine, and the views thereof are as follows:

Figure 1 is a side elevational view of the feeding end of a plating machine.

Figure 2 is a side elevational view of the delivery end of a plating machine.

Figure 3 is a fragmental side elevational view of a plating machine.

Figure 4 is an end elevation looking at the left end of Figure 3.

Figure 5 is an end elevation looking at the right end of Figure 3.

Figure 6 is an enlarged fragmental view of the feeding end of the machine looking outwardly from the inside.

Figure 7 is a vertical transverse section through a tank showing the articles suspended therein from and by the work rods.

Figure 8 is an enlarged fragmental vertical section showing the plating tank with the anodes mounted in the tank and the work rod as the cathode.

The conveying and transfer mechanism is not limited to the use of the plating machine but is shown and described in connection with such a machine. The mechanism is susceptible of application to other uses and the other uses would, of course, entail certain rearrangements, proportioning and operation of the several parts.

The machine comprises a framework consisting of uprights 1 and 2, top frame members 3, bottom frame members 4 and cross frame members 5 suitably joined and connected.

A plurality of tanks represented generally by the reference character 6 are placed on the floor within the frame of the machine and contain various kinds of solutions and other liquids such as water, whereby the articles to be plated are treated with a preliminary cleansing and rinsing solution and the proper plating solutions, with final rinsing.

The main conveyer chain 7 is an endless chain extending substantially the length of the machine and is carried by wheels 8, 9, 10 and 11 suitably journalled in the frame. There are two of the conveyer chains 7 arranged one near each side of the machine.

The wheels 8, 9, 10 and 11 are provided with teeth 12 for engaging the links of the chain 7. Intermediate the teeth 12 are recesses 13 through which project the ends of the work rods as the same are carried about the wheels, as will hereafter be more fully described.

The wheel 9 is mounted on a shaft 14 journalled at 15 in the frame of the machine and is driven by a gear 16 keyed to shaft 14 which gear in turn is driven by a gear 17 on shaft 18 journalled at 19. A gear 20 on shaft 21 drives gear 17, the gear 20 being driven through suitable mechanism from the main driving shaft 22.

The main driving shaft 22 is driven by a bevel gear 23 on the shaft in mesh with a bevel gear 24 which is driven by a sprocket 25 through chain 26 passing over sprocket 27 on a shaft 28 of a Reeves drive, which drive is actuated by a motor 29 on the top of the machine.

The main shaft 22 is driven at constant speed and therefore the main conveyer chain 7 is driven at constant speed.

The main conveyer chain 7 is provided at intervals in its length with fingers or dogs 30 to engage work rods 31 and move the rods through the machine.

The rods 31 have shoes 32 near each end thereof, which shoes are electrical conductors and slide along the trackways adjacent the several tanks of the machine.

The work rods 31 carry a plurality of depending bars 33 which may have prongs 34 extending outwardly from the bars 33 on which prongs are fastened the articles 35 to be plated. The bars 31 are hung on the work rods at the feeding end of the machine and are taken off the work rods at the delivery end.

The work rods and the connected bars form the cathodes of the electric circuits of the plating machine, as is more fully described in my copending application, Serial No. 289,588, filed June 30, 1928.

The transfer conveyer mechanism comprises a plurality of endless chains 36 passing over sprockets 37, 38, 39 and 40 journalled in side members 41 of the frame. The sprockets are all of the same size and are standard as to design, number of teeth and the like.

The sprockets 38 are carried on shaft 42 which shaft in turn carries a bevel gear 43 in mesh with a bevel 44 on the main driving shaft 42 so that the driving sprockets 38 of the several transfer conveyers are driven from the main driving shaft and at constant speeds, although the speeds of the several transfer conveyers may be different, one from another.

The horizontal distances between the vertical runs of the transfer conveyers varies as will be observed from Figures 1 and 2 of the drawings. This condition arises from the fact that some of the tanks 6 are longer than others and the time that the articles carried by the work rods 31 remain in some of the tanks varies.

The transfer conveyer chains 36 are provided with cups 45 pivoted at 46 to special links of the chain. The cups comprise spread or flared walls 47 diverging from the apex upwardly, and the length of the spread is substantially the distance between the pins connecting one link to the next.

The cups 45 hang, in all positions of movement of the chain 36, as shown in full lines in Figure 6.

Figure 6 shows the main conveyer chain 7 at the feeding end of the machine, that is, the end where the depending bars 33 with the articles attached are hung on the work-rods 31. The direction of movement of the transfer conveyer 36 is shown by the arrow.

The transfer conveyers 36 are arranged outwardly of the main conveyers 7 so that the cups 45 thereon will engage the ends of the work rods 31, as shown in Figure 8.

The bottom run of the main conveyer chain 7 is supported by a suitable rest 48 so that this run of the chain will be straight, and thus maintain the fingers or lugs 30 in engagement with the work rods 31 which in turn rest on the trackways (not shown) along the several tanks of the machine.

The transfer conveyer 36 as shown in Figure 6, has but one cup 45 thereon so that the cups 45 will pick up one work rod 31 from the main conveyer 7, lift it over the end of the tank 6 and deliver it to the next tank on the trackway in position to be engaged by one of the lugs or fingers 30 on the chain 7, ahead of the position occupied by the work rod when lifted from the main conveyer 7.

The driving connection between the driving sprocket 38 of the transfer conveyer and the main shaft 22 is such that the speed of the main conveyer chain 7 and the transfer conveyer chains is in synchronism.

The conveyer mechanism herein shown contemplates that the work rods 31 shall at all times be in engagement with the lugs 30 on the main conveyer chain and not removed from the machine, the timing of the drive of the main chain 7 being such as to afford time for removing the bars carrying the plated articles from the delivery end of the machine and for hanging other bars with articles to be plated thereon on the work rods at the feeding end of the machine.

The upper run of the main conveyer chain 7 has channels 49 disposed just below it so that the work rods 31 will rest on these channels in engagement with the lugs 30 on the chain 7 as the work rods are being moved from the delivery end of the machine to the feeding end of the machine, that is, towards the sprocket 11.

The work rods are prevented from falling away from the main conveyer 7 in the vertical runs of the main conveyer chain by an endless supplemental chain having offset L-shaped fingers 51 at intervals in its length.

The chain 50 is carried and driven by sprockets 52 on the shafts carrying the sprockets 8 and 11 of the main conveyer chain. The supplemental chain 50 moves in the direction indicated by the arrows at the right of Figure 6 with the offset L-shaped fingers so disposed and arranged as to underlie the work rods 31 as the same are moved off of the channels 49 whereby the work rods are then held between the offset L-shaped fingers 51 and the lugs 30 adjacent the fingers as shown at the right of Figure 6.

The operation of the machine is as follows:

The motor 29 which is controlled in any suitable manner, is put in operation, thereupon driving the main shaft 22, the sprockets 8, 9, 10 and 11, and the driving sprockets 38 of the several transfer conveyers.

Articles 35 are attached to the bars 33 while away from the machine. The bars are then hung on work rods 31 in any manner whereby a positive electrical contact is established. The work rods are then moved along the lower run of the conveyer chain 7 towards the first transfer conveyer 36 with the work rod in the position A of Figure 6 about to be engaged by the cup 45 on the transfer conveyer 36 as the same is moved through its cycle.

The parts are so timed that when the cup 45 is immediately below the lower run of the chain 7, the work rod 31 in the position A will be in position to be lifted by the cups 45 and will be moved over the end of the tank 6 and downwardly into the next tank where the rod is then deposited on the trackway ready to be engaged by one of the lugs 30 on the main chain 7, which engagement need not be immediate, as it may so happen that the work rod be deposited on the trackway between two lugs 30. This would not affect the timing of the pickup by the next transfer conveyer.

Should the movements of the conveyer chains be such that the work rod in the position A is either side of its proper position, the diverging walls 47 of the cup 45 will pick up the work rod, whatever its position, and move it over the end of the tank.

The conveyer chains and the sprocket wheels, as before stated, are standard parts. Should it so happen that as assembled, the timing of the transfer conveyer 36 is such that the cup 45 did not pick up a work rod in the position A, then instead of having to do what is now necessary with transfer mechanisms in use, that is, replacing defective parts with new parts or having other special parts made, the chain may be adjusted to vary the position of the cup thereon so that the same will be brought into position to engage the work rod in the A position as the same reaches this position by movement of the main conveyer chain 7.

Where the horizontal distances between the vertical runs of the several transfer conveyers 36 are different, then the lengths of the chains are altered, by adding more links in direct multiples of the number of teeth on the sprockets. In such event the gears 44 driving these transfer conveyers would have to be changed so that the cycle of movement of the cups on these transfer conveyers would correspond to the movement of the main chain.

Let it be assumed that the cycle of movement of the transfer conveyer 30 of Figure 6 requires one minute and the horizontal distance between the vertical runs of the next transfer conveyer is different from that of the first conveyer 36, then the gears driving this next conveyer must be such that the cycle of movement of this next conveyer 36 will be one minute. If the length of the conveyer chain in this next conveyer is greater than that of the first conveyer chain, the speed of the next conveyer chain will be greater than that of the first, whereas if it is shorter, the speed will be less.

The bars 33 have ends 33a which snap over the work rods 31 so that these may be readily applied to the work rods at the feeding end of the machine and removed therefrom at the delivery end. The engagement between the ends 33a and the work rods is such as to effect proper electrical connection for plating purposes.

The main conveyer chain 7 carries the work rods throughout the length of travel of the chain, as heretofore described. The bars 33 are removed from the work rods 31 at the delivery end of the machine and are applied to the work rods at the entrance end of the machine. The articles 35 are secured to bars 33 before the bars are placed on the work rods 31.

The conveying and transfer mechanism of this invention lends itself readily in designing machines for different sizes of articles to be plated and also for the variations between the pickup points and delivery points at the several points of transfer in the machine. Furthermore, the distances the articles have to be raised in different machines is readily arranged by varying the lengths of the transfer conveyer chains and the positioning of the sprockets carrying the same.

The speed of transfer from one tank to the next is governed by the lengths of the horizontal runs of the transfer conveyer chains. Where this time is short or quick, the horizontal runs will be correspondingly shorter than when this time is longer.

The sprockets for the transfer conveyer chains used in connection with this invention are the same in diameter and number of teeth, so that any sprocket may be used on any size machine. Likewise, the transfer conveyer chains are made of links of the same size. The lengths of the transfer conveyer chains vary, of course, in different machines. In any such transfer conveyer chain the number of links used is a direct multiple of the number of teeth in the sprockets.

The cycle of movement of the several transfer conveyer chains is arranged so that one complete cycle is made while the main conveyer chain advances a distance equal to the distance between two adjacent lugs or fingers 30, no matter what this distance may be.

The lugs or fingers 30 on the main chain 7 are shown as spaced three links apart. These lugs or fingers 30 may be spaced any regular distance from one link up to four, five or any other distance, depending on the design and arrangement of a particular machine.

Gears 44 which drive the transfer conveyer chains would have to be varied in accordance with the length and cycle of movement of the transfer conveyer chains driven thereby in any particular arrangement and design of machine.

The only timing necessary is that of the transfer conveyer chain in picking up a work or carrier rod from the trackway so that the rod is picked up immediately it is moved into the range of the cup 45 by one of the fingers or lugs 30 on the main conveyer chain 7.

The term "work rod" as used in the claims is used generally to include not only the rod per se but also the pieces or articles suspended therefrom, as well as the means for suspending such articles. The claims are, therefore, to be construed accordingly.

While I have described more or less precisely the details of construction of my invention, yet I do not wish to be understood as limiting myself thereto, as I am aware that changes may be made in the arrangement and proportion of parts and that equivalents may be substituted, all without departing from the spirit and scope of my invention.

I claim as my invention:

1. A conveying and transfer mechanism comprising a main conveyer chain, a plurality of transfer conveyer chains, the transfer conveyer chains being arranged with different horizontal distances between the vertical runs of some of the same, a drive shaft, driving means for every transfer conveyer chain, and connections between the drive shaft and the said several transfer conveyer chain driving means for driving all of said transfer conveyer chains in timed relation whereby one cycle of travel of one chain is the same in time as the cycle of travel of another transfer conveyer chain.

2. A conveying and transfer mechanism comprising a conveyer chain provided with fingers for moving a work rod in one direction along a trackway, said chain having an overhead return, means for maintaining said rod in contact with said fingers during the vertical portions of said overhead return and independent means for maintaining said rod in contact with said fingers during the horizontal portion of said return and transfer chains for lifting said rod from the trackway and depositing it on said trackway, ahead of the position occupied by the rod when lifted, for further movement by said conveyer chain.

3. A conveying and transfer mechanism comprising a conveyer chain provided with fingers for moving a work rod in one direction along a trackway, said chain having an overhead return, means comprising endless chains for maintaining said rod in contact with said fingers during the vertical portions of said overhead return and a channel member for maintaining said rod in contact with said fingers during the horizontal portion of said return, transfer chains each having a pivoted cup thereon for lifting a rod from said trackway and depositing it on said trackway ahead of the position occupied by the rod when lifted, for further movement by said conveyer chain and means for driving said transfer chains in synchronism with said conveyer chain.

4. A conveying and transfer mechanism comprising a conveyer chain provided with fingers for moving work rods through a machine, said chain having an overhead return, means for maintaining said rods in contact with said fingers during the vertical portions of said return and independent means for maintaining said rods in contact with said fingers during the horizontal portion of said return, a trackway for said rods, a plurality of transfer conveyers for removing rods from and depositing the same on said trackway, said transfer conveyers comprising endless chains moving in vertical planes, sprockets supporting said transfer chains substantially in quadrangular outline, a cup pivoted to each transfer chain for engaging said work rods, said cups being spread so as to extend beyond each side of the vertical run of the transfer chains, means for driving the transfer conveyer chains and means for driving the conveyer chain, said driving means operating in synchronism.

5. A conveying and transfer mechanism for moving work rods through a plurality of tanks of varying size, comprising a trackway for supporting said rods for movement through said tanks, a conveyer chain having spaced fingers thereon for moving said rods on said trackway, transfer chains having means thereon for engaging the end of a rod to lift the rod from one tank to another, said transfer chains having vertical rectangular paths the horizontal runs of some of which differ from the horizontal runs of others and means for driving said transfer chains in synchronism with said conveyer chain and at such speeds that they all complete a cycle of movement in the same time.

6. A conveyer and transfer device for moving a plurality of work rods through a plurality of tanks comprising a trackway for supporting said rods, a conveyer chain having spaced fingers thereon for moving said rods on said trackway, vertical transfer chains moving in rectangular pathways of different horizontal runs for lifting a rod from one tank into the next, means for driving said chains in synchronism with said conveyer chain and at such speed that all of said transfer chains make a complete cycle in the same time, said driving means and chains coacting in such a way that the horizontal runs of the chains may be varied upon maintaining the relative speeds between the transfer chains without affecting the speed of movement of said conveyer chain.

7. A conveyer and transfer device for moving a plurality of work rods through a plurality of tanks comprising a trackway for supporting said rods for movement through said tanks, a conveyer chain having spaced fingers thereon for moving said rods on said trackway, vertical transfer chains moving in rectangular pathways of different horizontal runs, pivoted cups on each chain for engaging the end of a rod to lift it from the trackway adjacent one tank onto the trackway of the next and means for driving said transfer chains and said conveyer chain at such speeds that each transfer chain completes a cycle of movement in the time said conveyer chain moves a distance equal to the distance between adjacent fingers thereon whereby it is only necessary to regulate the point of pickup of the rods by said pivoted cups.

In testimony whereof I have hereunto subscribed my name at Chicago, Cook County, Illinois.

CONSTANTINE G. MILLER.